US008851153B2

(12) United States Patent
Park et al.

(10) Patent No.: US 8,851,153 B2
(45) Date of Patent: Oct. 7, 2014

(54) SYSTEM AND METHOD FOR MANAGING WASTE HEAT OF ELECTRIC VEHICLE

(75) Inventors: Hee Sang Park, Hwaseong (KR); Hyun Kim, Gyeonggi-do (KR); June Kyu Park, Gyeonggi-do (KR); Jun Mo Ku, Gyeonggi-do (KR); Moo Yong Kim, Gyeonggi-do (KR); Soon Jong Lee, Chungcheongnam-do (KR); Tae Wan Kim, Daejeon (KR)

(73) Assignees: Hyundai Motor Company, Seoul (KR); Kia Motors Corporation, Seoul (KR); Doowon Climate Control Co., Ltd., Asan, Chungcheongnam-Do (KR); Halla Climate Control Corporation, Daejeon (KR)

( * ) Notice: Subject to any disclaimer, the term of this patent is extended or adjusted under 35 U.S.C. 154(b) by 314 days.

(21) Appl. No.: 13/315,897

(22) Filed: Dec. 9, 2011

(65) Prior Publication Data

US 2013/0030622 A1    Jan. 31, 2013

(30) Foreign Application Priority Data

Jul. 27, 2011    (KR) .......................... 10-2011-0074381

(51) Int. Cl.
| | |
|---|---|
| *B60H 1/00* | (2006.01) |
| *B60H 3/00* | (2006.01) |
| *B61D 27/00* | (2006.01) |
| *B60K 6/46* | (2007.10) |
| *B60H 1/14* | (2006.01) |

(52) U.S. Cl.
CPC ............... *B60K 6/46* (2013.01); *Y02T 10/6217* (2013.01); *B60H 1/143* (2013.01)
USPC ................... 165/41; 165/42; 165/43; 165/44; 165/45; 701/22

(58) Field of Classification Search
USPC ............................................... 701/22; 165/41
See application file for complete search history.

(56) References Cited

U.S. PATENT DOCUMENTS

| | | | | |
|---|---|---|---|---|
| 5,211,334 A | * | 5/1993 | Schatz | 237/12.3 B |
| 5,251,588 A | * | 10/1993 | Tsujii et al. | 123/142.5 R |
| 5,255,733 A | * | 10/1993 | King | 165/299 |
| 5,291,960 A | * | 3/1994 | Brandenburg et al. | 180/65.27 |
| 5,398,747 A | * | 3/1995 | Miaoulis | 165/41 |

(Continued)

FOREIGN PATENT DOCUMENTS

| | | |
|---|---|---|
| JP | 2002-354608 A | 12/2002 |
| JP | 2009-143509 A | 7/2009 |
| JP | 2010-023532 A | 2/2010 |

*Primary Examiner* — Bhavesh V Amin
(74) *Attorney, Agent, or Firm* — Edwards Wildman Palmer LLP; Peter F. Corless

(57) ABSTRACT

Disclosed herein is a waste heat management system of an electric vehicle. In particular, a pump for controlling the flow of cooling fluid, an OBC cooling fluid line and a motor cooling fluid line which diverge in parallel from an outlet of a cooling fluid line of the fluid pump, and a heater core cooling fluid line and a radiator cooling fluid line which are respectively connected in parallel with a junction of an inlet of the fluid pump cooling fluid line and a junction of outlets of the heater core cooling fluid line and the radiator cooling fluid line, are interconnected to provide both heating and air-conditioning to the interior of the vehicle. Additionally, the present invention, also allows the motor to be preheated when the vehicle is not running.

15 Claims, 8 Drawing Sheets

(56) References Cited

U.S. PATENT DOCUMENTS

| | | | |
|---|---|---|---|
| 5,441,099 A * | 8/1995 | Yasso | 165/41 |
| 5,441,122 A * | 8/1995 | Yoshida | 180/65.245 |
| 5,529,114 A * | 6/1996 | Hall et al. | 165/41 |
| 5,531,285 A * | 7/1996 | Green | 180/65.25 |
| 5,938,114 A * | 8/1999 | Zeyen et al. | 237/12.3 R |
| 6,010,076 A * | 1/2000 | Winik | 237/12.3 B |
| 6,213,233 B1 * | 4/2001 | Sonntag et al. | 180/65.245 |
| 6,464,027 B1 * | 10/2002 | Dage et al. | 180/65.22 |
| 6,607,142 B1 * | 8/2003 | Boggs et al. | 237/12.3 B |
| 6,722,147 B2 * | 4/2004 | Heyl et al. | 62/244 |
| 7,007,491 B2 * | 3/2006 | Grimm et al. | 62/230 |
| 7,140,330 B2 * | 11/2006 | Rogers et al. | 123/41.14 |
| 7,147,071 B2 * | 12/2006 | Gering et al. | 237/12.3 B |
| 7,789,176 B2 * | 9/2010 | Zhou | 180/65.1 |
| 7,841,431 B2 * | 11/2010 | Zhou | 180/65.1 |
| 7,870,892 B2 * | 1/2011 | Gawthrop | 165/271 |
| 8,261,868 B2 * | 9/2012 | Goenka et al. | 180/68.2 |
| 8,336,319 B2 * | 12/2012 | Johnston et al. | 62/79 |
| 8,402,776 B2 * | 3/2013 | Johnston et al. | 62/79 |
| 8,408,012 B2 * | 4/2013 | Goenka et al. | 62/3.3 |
| 2005/0044873 A1 * | 3/2005 | Tamai et al. | 62/323.1 |
| 2008/0166284 A1 * | 7/2008 | Son et al. | 423/247 |
| 2012/0048504 A1 * | 3/2012 | Park et al. | 165/41 |

* cited by examiner

SYSTEM AND METHOD FOR MANAGING WASTE HEAT OF ELECTRIC VEHICLE

CROSS-REFERENCE TO RELATED APPLICATION

This application claims under 35 U.S.C. §119(a) the benefit of Korean Patent Application No. 10-2011-0074381 filed on Jul. 27, 2011 the entire contents of which are incorporated herein by reference.

BACKGROUND OF THE INVENTION

1. Technical Field

The present invention relates to a system and method for managing waste heat discharged from an electric vehicle, which can effectively use the waste heat generated from an onboard charger (OBC) or a motor of an electric vehicle to heat the electric vehicle, and can improve the fuel efficiency of an electric vehicle by heating a motor using the waste heat generated from the onboard charger (OBC).

2. Description of the Related Art

The term "electric vehicle" refers to a vehicle that uses electricity as its main source of power, that is, a vehicle that is equipped with a system for charging a battery with electricity and then supplying the electricity to a motor as a drive source. For example, there are electrically-rechargeable vehicles, hybrid vehicles, fuel-cell vehicles, and the like.

An electric vehicle is provided with an onboard charger (OBC, slower charger) to charge the battery. The onboard charger (OBC) is equipment for charging a battery by connecting the battery to a household 110V or 220V power source. Further, such an electric vehicle is provided with an LDC (low voltage DC to DC converter, voltage converter) so that battery power can be used to operate electronic components within the vehicle. Furthermore, such an electric vehicle is provided with an inverter and a motor to transfer drive force accordingly.

The OBC, LDC, inverter and motor of the electric vehicle are all components that generate waste heat. In the electric vehicle, waste heat is generated from the OBC while a battery is charging, is generated from the inverter and motor while the electric vehicle is running, and is generated from the LDC while the electronic components are operating.

If such inventive means are suitably utilized, the limitations associated with battery life can be reduced because the entire fuel efficiency of an electric vehicle can be increased through efficient reuse of this heat, and, particularly, the fuel efficiency of the electric vehicle in winter can be increased by preheating the inverter or the motor.

However, as shown in FIG. 1, the conventional heat exchange system for an electric vehicle is configured so that waste heat cannot be used, because a positive temperature coefficient (PTC) heater 10 and blower 12 consume additional electricity to heat the interior of the electric vehicle, and because the motor compartment is provided with a fluid pump 20, an LDC 30, an inverter 40, a motor 50 and an OBC 60 connected in series with each other and is cooled by operation of a fan 72 while air is passed through a radiator 70.

Furthermore, although the waste heat generated from the OBC 60 is used in this system, the waste heat leaks from the radiator and is separated from and not used to heat the interior of the electric vehicle, and thus the waste heat is not efficiently used.

The OBC 60 functions to charge a high-voltage battery by boosting the voltage of a household alternating power source using a transformer and then converting the household alternating power source into DC power source using a rectifier when the high-voltage battery must be recharged, in addition to the rapid charge of the high-voltage battery while the vehicle is plugged into a charging station. In order to prevent the OBC 60 from overheating while charging the high-voltage battery, the water pump 20, the radiator 70 and the fan 72 are operated so that the temperature of the OBC 60 does not reach a threshold temperature. However, due to the architecture and configuration of this system, unnecessary heat transfer occurs because the OBC 60 is disposed within the circulating cycle in order to cool the motor 50, the inverter 40 and the like even while the electric vehicle is running.

Therefore, a system and method of compensating for the insufficient battery performance of the electric vehicle by efficiently using the waste heat generated from the OBC 60 and the motor 50 are required.

SUMMARY OF THE INVENTION

Accordingly, the present invention has been devised to solve the above-mentioned problems, and an object of the present invention is to increase the fuel efficiency of an electric vehicle by using the waste heat generated from an OBC and a motor to heat the interior of the electric vehicle and to preheat the motor.

In order to accomplish the above object, an aspect of the present invention provides a waste heat management system of an electric vehicle, including: a pump for controlling the flow of cooling fluid; an OBC cooling fluid line and a motor cooling fluid line which diverge in parallel from an outlet of a cooling fluid line of the fluid pump; and a heater core cooling fluid line and a radiator cooling fluid line which are respectively connected in parallel with a junction of an inlet of the fluid pump cooling fluid line and a junction of outlets of the heater core cooling fluid line and the radiator cooling fluid line.

Here, the OBC cooling fluid line may be provided with an OBC and LDC connected in series with each other, and the pump cooling fluid line may be provided at an outlet thereof with an LDC cooling fluid line in parallel with the OBC cooling fluid line and the motor cooling fluid line.

The outlet of the pump cooling fluid line may be connected with inlets of the OBC cooling fluid line and the motor cooling fluid line by a multi-way valve, and the heater core cooling fluid line and the radiator cooling fluid line may be connected to the junction of the outlets of the OBC cooling fluid line and the motor cooling fluid line by a multi-way valve.

The waste heat management system may further include a control unit, e.g., a controller. The control unit serves to allow cooling fluid to pass through the OBC cooling fluid line, the motor cooling fluid line and the heater core cooling fluid line during battery charging and to allow cooling fluid to pass through the motor cooling fluid line and the heater core cooling fluid line when the battery is not charging.

Another aspect of the present invention provides a method of managing the waste heat of an electric vehicle using an OBC cooling fluid line and a motor cooling fluid line that diverge in parallel from a pump, including the steps of: determining a temperature to select either heating and air-conditioning; and determining whether or not a battery is charging when heating is selected, and then passing cooling fluid through an OBC cooling fluid line, a motor cooling fluid line and a heater core cooling fluid line while the battery is charging, and passing cooling fluid through a motor cooling fluid line and a heater core cooling fluid line when the battery is not charging.

Here, the step of heating may further include the step of: passing cooling fluid through an OBC cooling fluid line, a motor cooling fluid line and a heater core cooling fluid line, when air-conditioning is selected.

In the step of determining the temperature, heating or air-conditioning may be selected based on the interior temperature of the electric vehicle or the comfort level of the users. In this regard, the desired internal temperature of the electric vehicle or the air conditioner temperature may be set by a user.

In the step of heating, when a battery is charging, the operation of a pump, the operation of a blower adjacent to a heater core, and the discharging of cooling fluid into a radiator cooling fluid line may be sequentially performed in a predetermined program. Furthermore, when a battery is not charging, the operation of a pump and the discharging of cooling fluid into a radiator cooling fluid line may be sequentially performed in a predetermined program instructions stored on a computer readable medium and executed by the controller. The predetermined program instructions may be set based on the temperature increase of the cooling fluid.

In the step of heating, the discharging of cooling fluid into a radiator cooling fluid line may be performed in the predetermined program instructions, and then the opening of an air flap and the operation of a fan or other air turbulation device adjacent to a radiator may be sequentially performed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
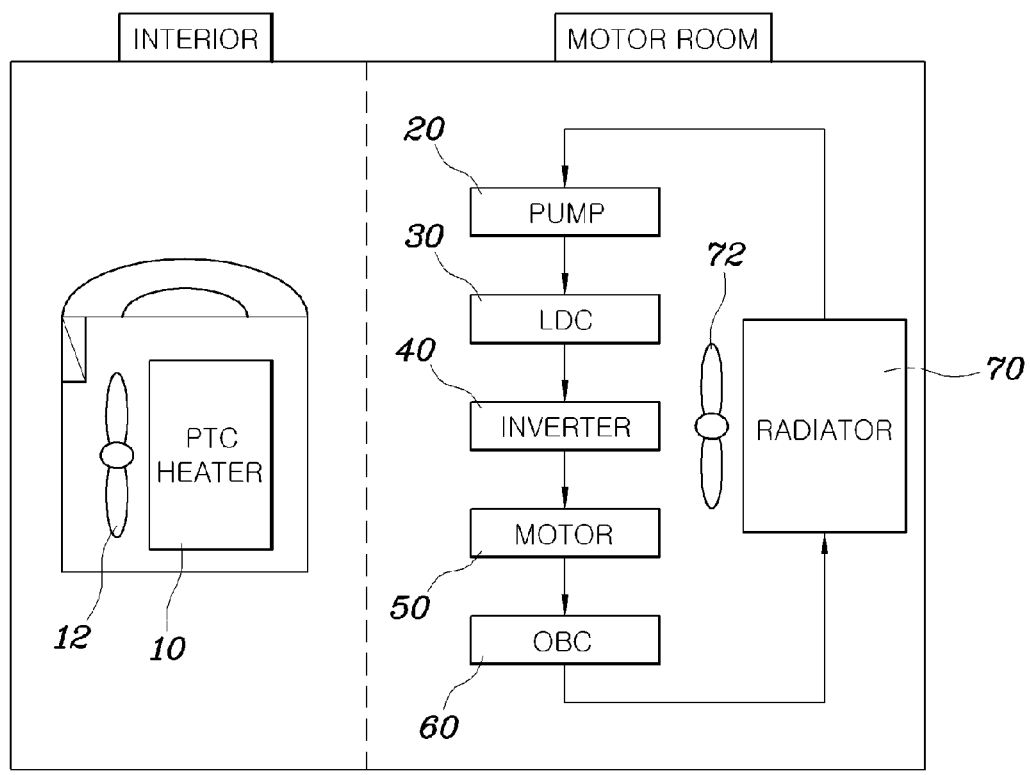
FIG. 1 is a view showing a conventional waste heat management system of an electric vehicle.
Figure 2:
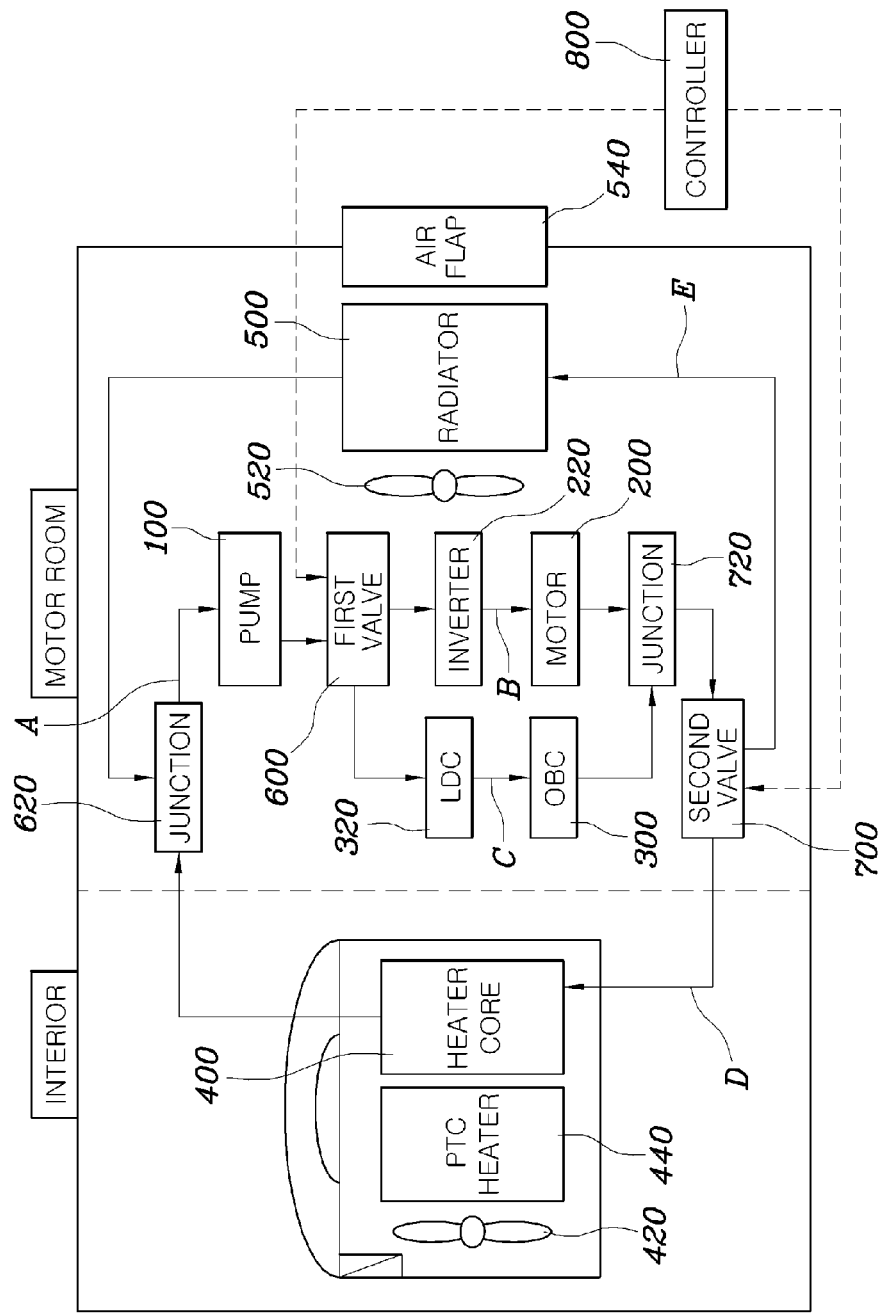
FIG. 2 is a waste heat management system of an electric vehicle according to an exemplary embodiment of the present invention.

FIG. 2 is a waste heat management system for an electric vehicle according to an exemplary embodiment of the present invention. The waste heat management system includes: a pump 100 for controlling the flow of cooling fluid; an OBC cooling fluid line (C) and a motor cooling fluid line (B) which diverge in parallel from an outlet of a cooling fluid line (A) of the pump 100; and a heater core cooling fluid line (D) and a radiator cooling fluid line (E) which are respectively connected in parallel with a junction of an inlet of the pump cooling fluid line (A) and a junction of outlets of the heater core cooling fluid line (D) and the radiator cooling fluid line (E).

Concretely, an electric vehicle is largely divided into an interior compartment and a motor compartment. The interior is provided with a heater core 400, and the motor compartment is provided with a pump 100, a motor 200, an OBC 300 and a radiator 500. All of the components are connected by cooling fluid lines, and thus the waste heat generated from one side thereof can be transferred to the other side thereof. The transfer of waste heat is controlled by allowing a control unit, e.g., a controller, to switch or control a pump valve and a multi-way valve, accordingly. In this way, an electric vehicle can use a heater core, rather than a PTC heater, and can heat the interior compartment and the motor compartment of the vehicle using the waste heat generated from an OBC and other components.

The cooling fluid line (A) connected with the fluid pump 100 is a fluid pump cooling fluid line (A), and the fluid pump cooling fluid line (A) is provided at the outlet thereof with an OBC cooling fluid line (C) and a motor cooling fluid line (B) which are disposed in parallel to each other.

The pump cooling fluid line (A) may be further provided at the outlet thereof with an LDC cooling fluid line in parallel with the OBC cooling fluid line (C) and the motor cooling fluid line (B). Since the LDC 320 generates heat when electric components are operating, it may be connected in series or in parallel with the OBC 300. In this embodiment, as shown in FIG. 2, the LDC 320 is connected in series with the OBC 300. Since the times over which the OBC 300 and LDC 320 generate heat are different from that of the motor 200, which is a drive unit, it is preferred that they be separated from the motor 200 and be connected in parallel with each other.

Further, a heater core cooling fluid line (D) and a radiator cooling fluid line (E) are respectively connected in parallel at a junction of an inlet of the pump cooling fluid line (A) and a junction of outlets of the OBC cooling fluid line (C) and the motor cooling fluid line (B). That is, as shown in FIG. 2, the outlet of each of the heater core cooling fluid line (D) and the radiator cooling fluid line (E) are connected to the inlet of the pump cooling fluid line (A), and the inlet of the heater core and the radiator are connected to the junction of the outlets of the OBC cooling fluid line (C) and the motor cooling fluid line (B), and thus the heater core cooling fluid line (D) and the radiator cooling fluid line (E) are entirely connected in parallel to each other. Therefore, when it is required to transfer the heat generated from these components to the interior compartment or exterior components of an electric vehicle, a cooling fluid line can be selectively formed.

Meanwhile, the outlet of the pump cooling fluid line (A) is connected with the inlets of the OBC cooling fluid line (C) and the motor cooling fluid line (B) by a multi-way valve 600 (hereinafter, referred to as "first valve"). In this case, the pump cooling fluid line (A) is connected with the OBC cooling fluid line (C) by the first valve in order to use the waste heat generated from the OBC, the fluid pump cooling fluid line (A) is connected with the motor cooling fluid line (B) by the first valve in order to use the waste heat generated from the motor, and the fluid pump cooling fluid line (A) is connected with both the OBC cooling fluid line (C) and the motor cooling fluid line (B) by the first valve in order to use the waste heat generated from both the OBC and the motor or in order to transfer the waste heat generated from the OBC to the motor.

Figure 3:
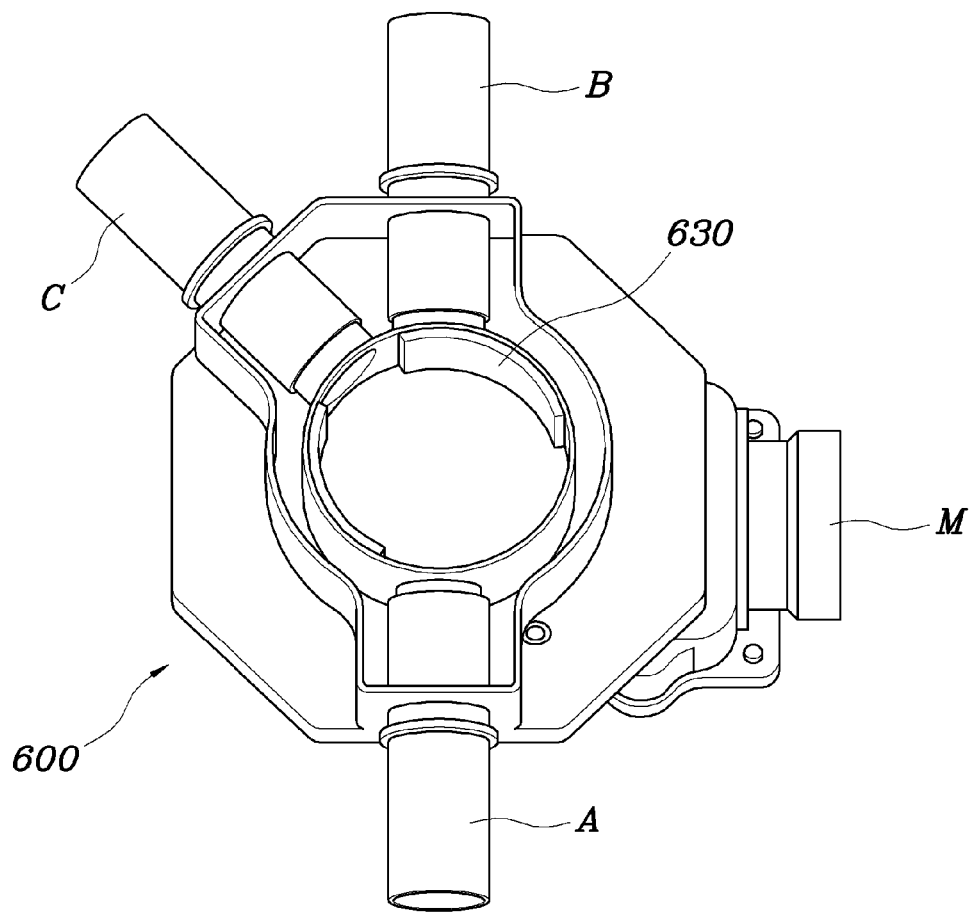
FIG. 3 is a view showing a multi-way valve of the waste heat management system shown in FIG. 2.

FIG. 3 shows the multi-way valve 600. As shown in FIG. 3, the multi-way valve 600 includes: a branch connector connected with the fluid pump cooling fluid line (A), the OBC cooling fluid line (C) and the motor cooling fluid line (B); a switching door 630 provided with a plurality of through-holes or bores; and a drive unit (M) rotating the switching door 630. Therefore, the multi-way valve 600 can freely change the cooling fluid line by rotating the switching door 630.

Further, the heater core cooling fluid line (D) and the radiator cooling fluid line (E) are connected to the junction of the outlets of the OBC cooling fluid line (C) and the motor cooling fluid line (B) by a multi-way valve 700 (hereinafter, referred to as "second valve"). Therefore, the junction of the outlets of the OBC cooling fluid line (C) and the motor cooling fluid line (B) are selectively connected to the heater core cooling fluid line (D) or the radiator cooling fluid line (E) by the second valve, and thus the waste heat can be selectively transferred to the interior compartment or exterior components in the motor compartment of the electric vehicle.

Finally, when an electric vehicle has to be heated, the waste heat management system may further include a control unit, e.g., a controller. The control unit serves to allow cooling fluid to pass through the OBC cooling fluid line (C), the motor cooling fluid line (B) and the heater core cooling fluid line (D) while the battery is charging and to allow cooling fluid to pass through the motor cooling fluid line (B) and the heater core cooling fluid line (D) when the battery is not charging. Further, the control unit serves to determine the flow rate of cooling fluid by controlling the on-off state or flow rate of the pump 100 through mechanical control of the pump depending upon the type of pump which is used, and serves to form a cooling fluid passage in a desired direction by controlling the multi-way valves 600 and 700.

When an electric vehicle has to be heated, the control unit serves to use the waste heat generated from the OBC 300 while the battery is charging in winter to heat an electric vehicle by passing cooling fluid through the OBC cooling fluid line (C), the motor cooling fluid line (B) and the heater core cooling fluid line (D), and serves to remarkably reduce the initial consumption of electricity of the motor 200 by using this waste heat to preheat the motor 200.

Further, when the interior compartment an electric vehicle has to be heated, the control unit serves to use the waste heat generated from the motor 300 when the battery is not charging to heat an electric vehicle by passing cooling fluid through the motor cooling fluid line (B) and the heater core cooling fluid line (D). In this case, cooling fluid does not pass through the OBC 300 and the radiator 500, so that the leakage of the waste heat can be prevented, thereby maximizing the heating efficiency of an electric vehicle.

Figure 4:
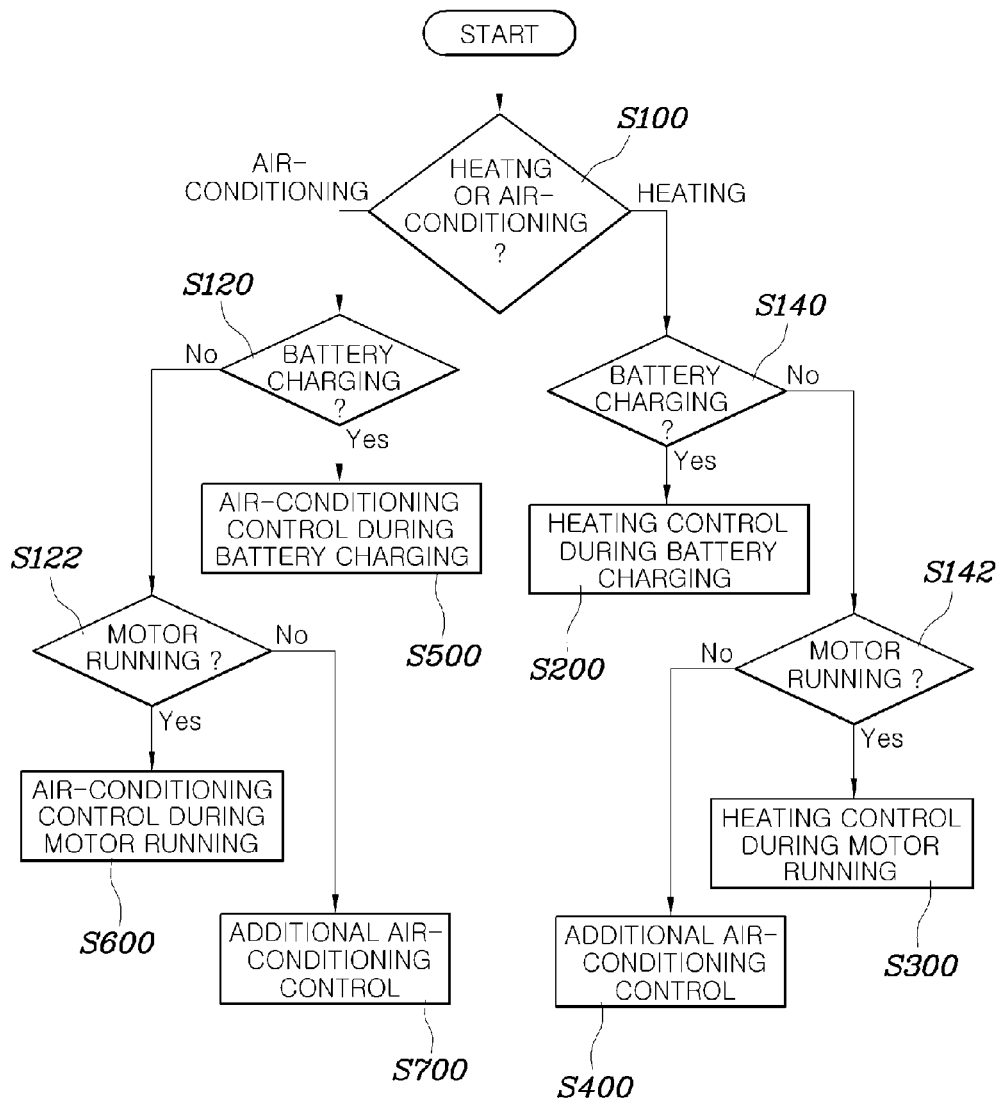
FIG. 4 is a flowchart showing a method of managing waste heat using the waste heat management system shown in FIG. 2.

FIG. 4 is a flowchart showing a method of managing waste heat using the waste heat management system shown in FIG. 2. The waste heat management method, which is a waste heat management method of an electric vehicle using an OBC cooling fluid line and a motor cooling fluid line diverging in parallel from a fluid pump, includes the steps of: determining a temperature to select any one of heating or air-conditioning (S100); and, when heating is selected, determining whether or not a battery is charging, and then passing cooling fluid through an OBC cooling fluid line, a motor cooling fluid line and a heater core cooling fluid line while the battery is charging, and passing cooling fluid through a motor cooling fluid line and a heater core cooling fluid line when the battery is not charging (S200, S300).

First, a temperature is determined so that any one of heating and air-conditioning (S100) can be selected. Here, heating or air-conditioning is selected based on the interior temperature of an electric vehicle, the external temperature of an electric vehicle or the air conditioner temperature may be set by a user. When heating is selected, it is determined whether or not a battery is charging (S140). When the battery is charging, cooling fluid is passed through an OBC cooling fluid line, a motor cooling fluid line and a heater core cooling fluid line. That is, a heating control process during battery charging initiates (S200). Further, when an electric vehicle is running, a heating control process is performed (S300). Further, only when electric components are operating without charging the battery and the electric vehicle is not running, additional heating control may be performed (S400). The additional heating control process can be performed in various ways. Typically, this additional heating control process may be performed only by heat transfer attributable to conduction.

Meanwhile, when air-conditioning is selected, cooling fluid is passed through an OBC cooling fluid line, a motor cooling fluid line and a heater core cooling fluid line (S500, S600). This air-conditioning process may also include an air-conditioning control process during battery charging, an air-conditioning control process during running, and an additional air-conditioning control process.

Figure 5:
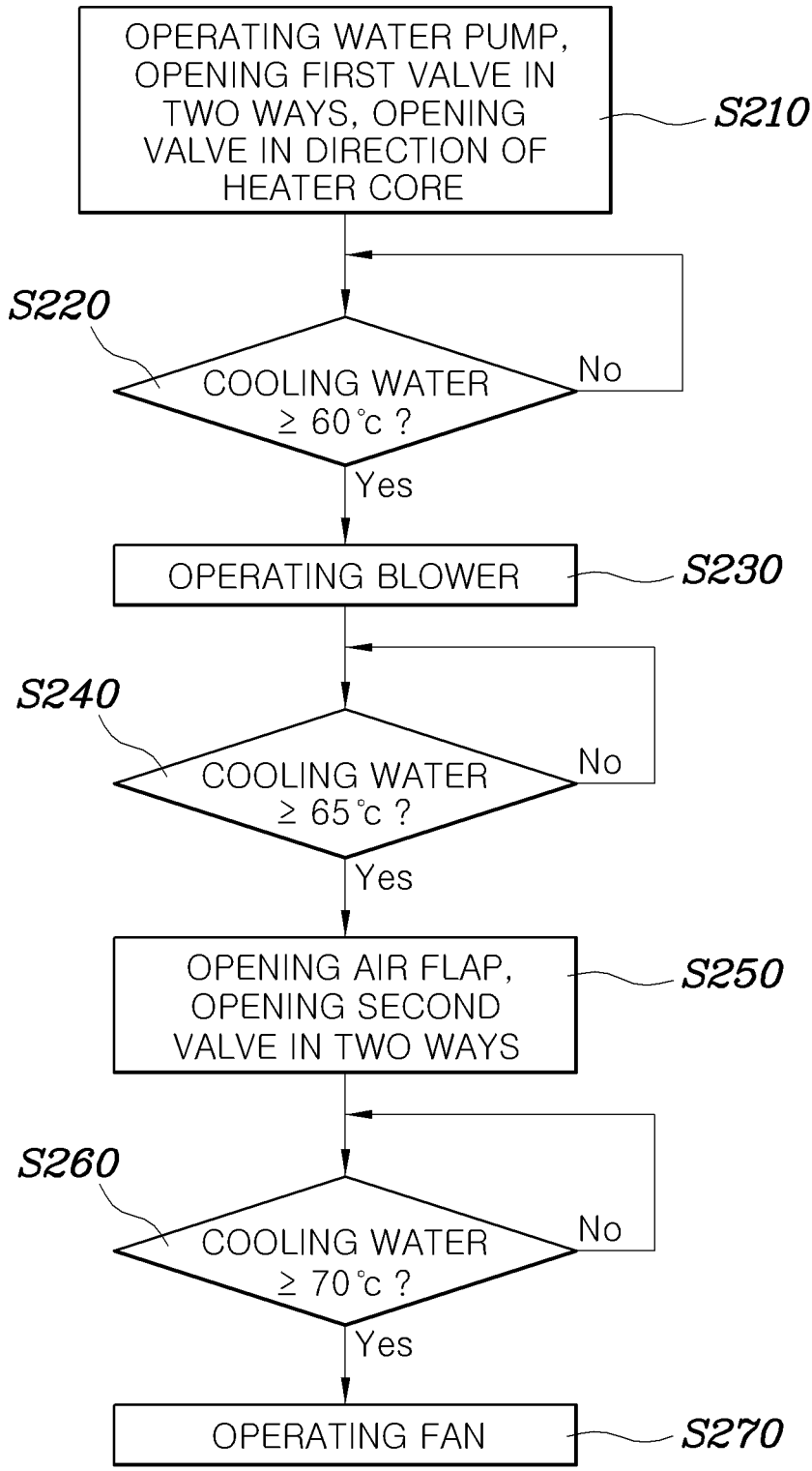
FIG. 5 is a flowchart showing a heating control process that takes place while the battery is being charged in the method of managing waste heat shown in FIG. 4.

FIG. 5 is a flowchart showing a heating control process during battery charging in the method of managing waste heat shown in FIG. 4. In the step of heating (S200, S300), when a battery is charging, the operation of a pump, the operation of a blower adjacent to a heater core, and the discharging of cooling fluid into a radiator cooling fluid line are sequentially performed in a predetermined program, executed by a controller. The predetermined program is set based on the temperature increase of the cooling fluid. Further, in the step of heating (S200, S300), the discharging of cooling fluid into a radiator cooling fluid line is performed in the predetermined program, and then the opening of an air flap and the operation of a fan or other air turbulation device adjacent to a radiator may be further sequentially performed.

Referring to FIG. 5, when the heating control process starts, first, the pump is operated, and then the first valve is opened in two directions to allow cooling fluid to flow into both an OBC and a motor. Further, a second valve is opened only in the direction of a heater core to heat the interior of an electric vehicle (S210).

Thereafter, once the temperature of cooling fluid is increased to 60° C. or above while battery charging is in progress (S210), a blower adjacent to a heater core in the interior of an electric vehicle is operated to allow a larger amount of waste heat to be discharged to the interior of the electric vehicle (S230). Further, when the temperature of cooling fluid is 65° C. or above (S240), an air flap located at the outside of an electric vehicle is opened to discharge heat outside of the electric vehicle, and the second valve is opened in both directions (S250). Further, since abnormal overheating occurs when the temperature of cooling fluid is 70° C. or above (S260), in order to protect an OBC, a fan or other air turbulation device adjacent to a radiator is operated to discharge a larger amount of heat to the outside of the electric vehicle (S270).

In this heating control process, the temperature range of cooling fluid may be changed to a variety of ranges. Further, during the heating control process, prior to the detection of the temperature of cooling fluid, whether or not an abnormal temperature of an OBC or an LDC is detected, and thus it is possible to cope with overheating. For this reason, thermal efficiency can be improved, and stability can be assured while a battery is charged.

Figure 6:
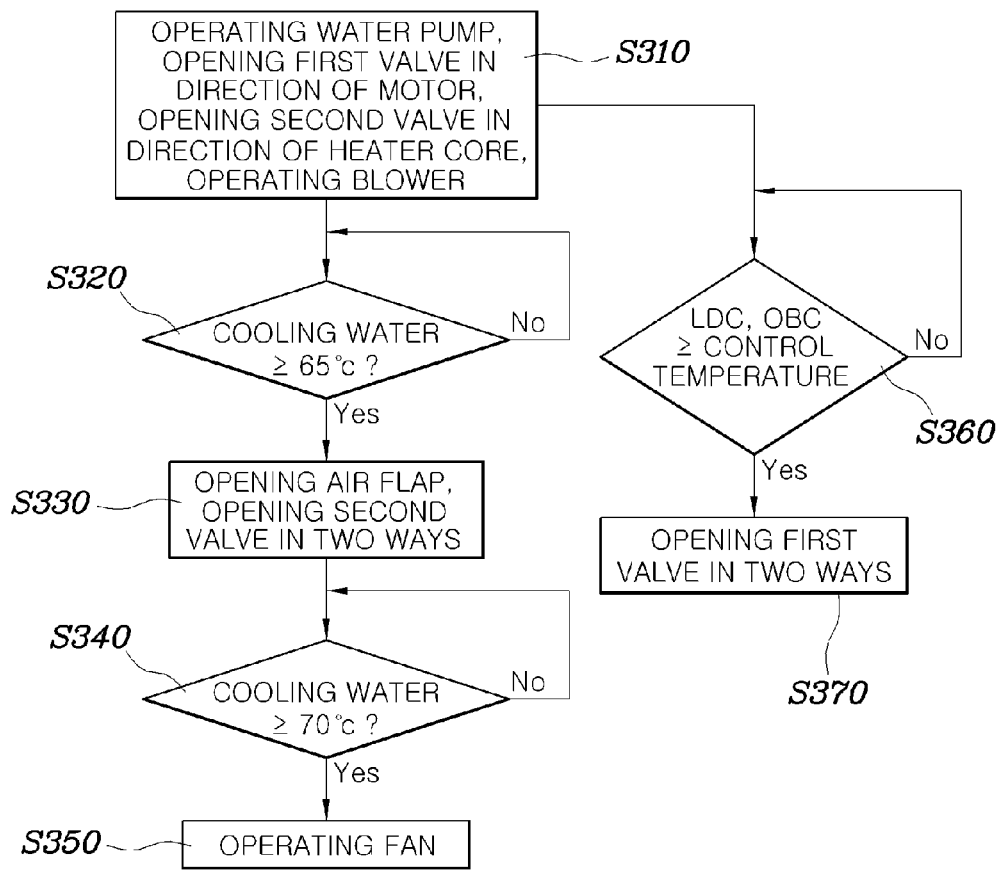
FIG. 6 is a flowchart showing a heating control process while the vehicle is running in the method of managing waste heat shown in FIG. 4.

FIG. 6 is a flowchart showing a heating control process during running in the method of managing waste heat shown in FIG. 4. In the step of heating (S200, S300), when it is determined that a battery is not charging or a motor is running, the operation of a fluid pump, and the discharging of cooling fluid into a radiator cooling fluid line are sequentially performed in a predetermined program. The predetermined program may be set based on the temperature increase of the cooling fluid. Further, in step of heating (S200, S300), the discharging of cooling fluid into a radiator cooling fluid line is performed in the predetermined program, and then the opening of an air flap and the operation of a fan or other air turbulation device adjacent to a radiator may be further sequentially performed.

Referring to FIG. 6, when heating is required and the motor is running, first, the pump is operated, the first valve is opened only in the direction of the motor, and the second valve is opened only in the direction of the heater core to operate a blower located at the interior of an electric vehicle (S310). Therefore, the waste heat generated from the motor during running of the vehicle can be transferred to the interior of the electric vehicle without heat leaking out.

Thereafter, once the temperature of cooling fluid is increased to 65° C. or above (S320), an air flap located at the outside of an electric vehicle is opened, and the second valve is opened in two directions to discharge heat to the outside of an electric vehicle by heat transfer (S330). Therefore, the motor can be maintained within the stable temperature range.

Thereafter, once the temperature of cooling fluid is 70° C. or above (S340), a fan or other air turbulation device adjacent to a radiator is operated to discharge a larger amount of heat (S350), accordingly. Meanwhile, the temperature of an LDC or an OBC is continuously checked to determine whether the temperature thereof is a threshold temperature or lower. In this case, when overheating occurs, the first valve is opened in both directions to transfer the waste heat generated from the LDC and OBC to the motor and the interior of an electric vehicle to heat the interior accordingly, and to transfer this waste heat to the outside of the electric vehicle to discharge heat (S370).

Figure 7:
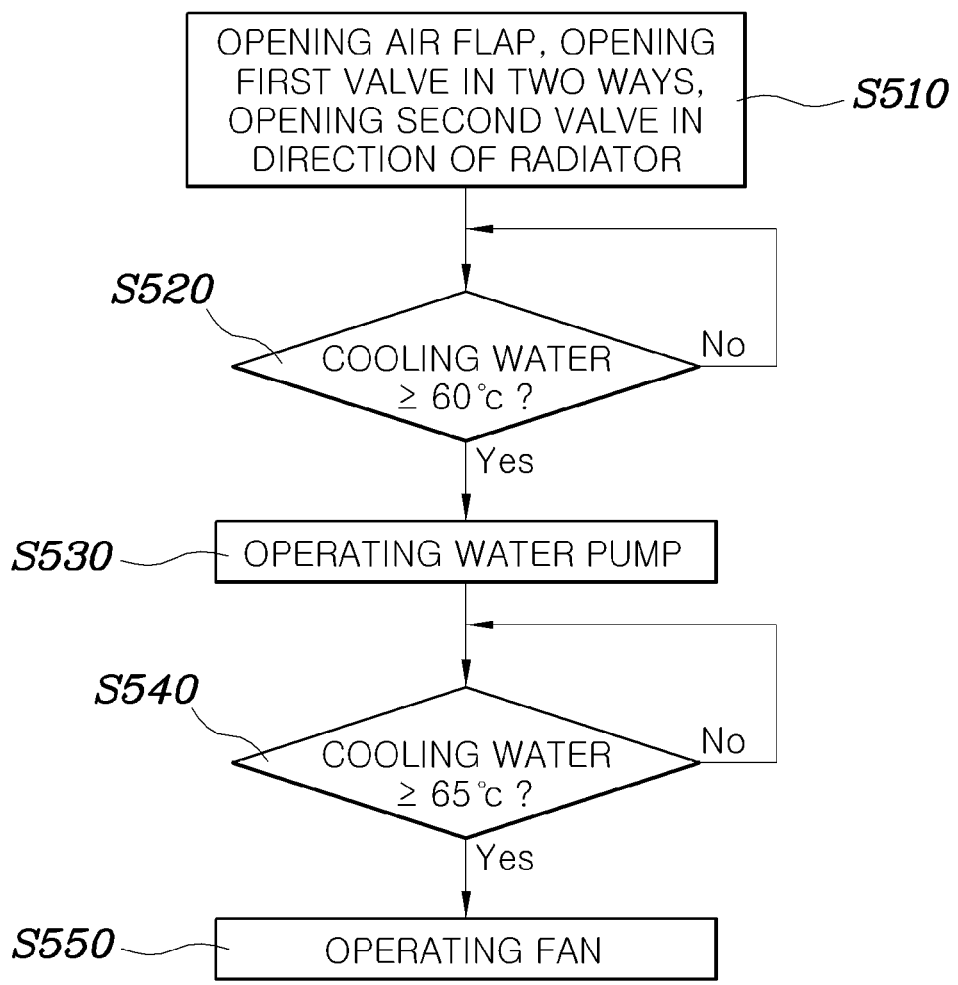
FIG. 7 is a flowchart showing an air-conditioning control process while the battery is being charged in the method of managing waste heat shown in FIG. 4.
Figure 8:
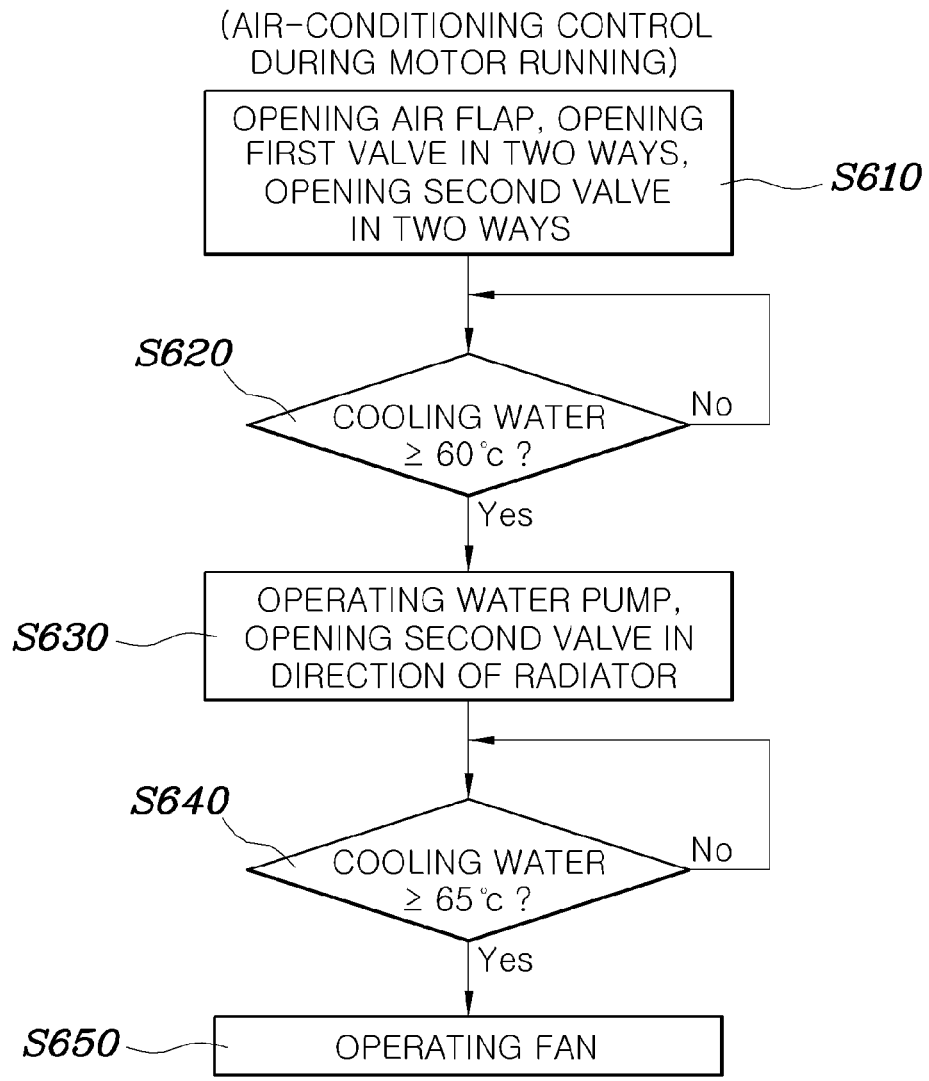
FIG. 8 is a flowchart showing an air conditioning process while the vehicle is running in the method of managing waste heat shown in FIG. 4.

FIG. 7 is a flowchart showing an air-conditioning control process during battery charging in the method of managing waste heat shown in FIG. 4, and FIG. 8 is a flowchart showing an air conditioning process during running in the method of managing waste heat shown in FIG. 4. In the air-conditioning control process during battery charging, first, an air flap is opened, and then the first valve is opened in both directions to allow a motor to absorb the waste heat generated from the OBC, and the second valve is opened only in the direction of a radiator to prevent hot air from being introduced into the interior of an electric vehicle (S510).

Thereafter, once the temperature of cooling fluid is 60° C. or above (S520), a pump is operated to discharge heat (S530), and, once the temperature of cooling fluid is 65° C. or above (S540), a fan or other air turbulation device adjacent to the radiator is operated to discharge a larger amount of heat to the outside of an electric vehicle (S550).

In the air-conditioning control process during running, although similar to the air-conditioning control process during battery charging, in the initial step (S610), the second valve is opened in both directions to absorb the heat generated from the motor to some degree even in the interior of an electric vehicle to improve the performance of the motor. When the temperature of cooling fluid is 60° C. or above (S620), the second valve is opened only in the direction of a radiator to prevent excessively hot air from being introduced into the interior of the electric vehicle (S630). Here, the comfort level and air-conditioning performance in the interior of an electric vehicle are chiefly weighed against the performance of the motor. Other steps in the air-conditioning control process during running of the vehicle are similar to those of the air-conditioning control process while the battery is being charged.

Furthermore, the control of the system of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

As described above, according to the system and method for managing waste heat of an electric vehicle, the waste heat generated from an OBC and a motor can be used to heat the interior of the electric vehicle and to preheat the motor, thus increasing the fuel efficiency of the electric vehicle. Further, electricity can be efficiently used because the waste fluid is controlled in stages, and the stability of parts to heat generation can be assured. Furthermore, the consumption of energy can be reduced in both summer and winter because an air conditioning process and a heating process are efficiently performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A waste heat management system of an electric vehicle, comprising:
   a pump configured to control a flow of cooling fluid through the system;
   an onboard charger (OBC) cooling fluid line and an electric motor cooling fluid line which diverge in parallel from an outlet of a cooling fluid line of the pump; and
   a heater core cooling fluid line and a radiator cooling fluid line which are respectively connected in parallel at a junction with an inlet of the fluid pump cooling fluid line and at a junction of outlets of the heater core cooling fluid line and the radiator cooling fluid line.

2. The waste heat management system according to claim 1, wherein an OBC and a low voltage DC to DC converter (LDC) are disposed in series with each other in the OBC cooling fluid line.

3. The waste heat management system according to claim 1, wherein the pump cooling fluid line is provided at an outlet of the pump with an LDC cooling fluid line in parallel with the OBC cooling fluid line and the electric motor cooling fluid line.

4. The waste heat management system according to claim 1, wherein the outlet of the pump cooling fluid line is connected with inlets of the OBC cooling fluid line and the electric motor cooling fluid line by a multi-way valve.

5. The waste heat management system according to claim 1, wherein the heater core cooling fluid line and the radiator cooling fluid line are connected to the junction of the outlets of the OBC cooling fluid line and the electric motor cooling fluid line by a multi-way valve.

6. The waste heat management system according to claim 1, further comprising a controller configured to allow cooling fluid to pass through the OBC cooling fluid line, the electric motor cooling fluid line and the heater core cooling fluid line while the battery is charging and to allow cooling fluid to pass through the electric motor cooling fluid line and the heater core cooling fluid line when the battery is not charging.

7. A method of managing waste heat of an electric vehicle using an OBC cooling fluid line and an electric motor cooling fluid line that diverge in parallel from a fluid pump, comprising the steps of:
   determining a temperature to select any one of heating and air-conditioning; and
   determining whether or not a battery is charging when heating has been selected, and then passing cooling fluid through an onboard charger (OBC) cooling fluid line, the electric motor cooling fluid line and a heater core cooling fluid line while the battery is charging, and passing cooling fluid through the electric motor cooling fluid line and a heater core cooling fluid line while the battery is not charging.

8. The method of managing waste heat according to claim 7, wherein the step of heating further comprises the step of: passing cooling fluid through an OBC cooling fluid line, the electric motor cooling fluid line and the heater core cooling fluid line, when the air-conditioning is selected.

9. The method of managing waste heat according to claim 7, wherein, in the step of determining the temperature, the heating or air-conditioning is selected based on an interior temperature of the electric vehicle, an external temperature of the electric vehicle or an air conditioner temperature set by a user.

10. The method of managing waste heat according to claim 7, wherein, in the step of heating, when a battery is charging, the operation of a pump, the operation of a blower adjacent to a heater core, and the discharging of cooling fluid into the radiator cooling fluid line are sequentially performed in a predetermined program.

11. The method of managing waste heat according to claim 7, wherein, in the step of heating, when a battery is not charging, the operation of a pump and the discharging of cooling fluid into a radiator cooling fluid line are sequentially performed in a predetermined program.

12. The method of managing waste heat according to claim 10, wherein the predetermined program is set based on a temperature increase of cooling fluid.

13. The method of managing waste heat according to claim 10, wherein, in the step of heating, the discharging of cooling fluid into the radiator cooling fluid line is performed in the predetermined program, and then the opening of an air flap and the operation of an air turbulation device adjacent to a radiator are sequentially performed.

14. The method of managing water heat according to claim 13 wherein the air turbulation device is a fan.

15. A non-transitory computer readable medium containing executable program instructions executed by a processor, comprising:
   program instructions that determine a temperature in an electric vehicle and select any one of heating and air-conditioning; and
   program instructions that determine whether or not a battery is charging when heating has been selected, and then control a first and second valve to pass cooling fluid through an on board charger (OBC) cooling fluid line, an electric motor cooling fluid line and a heater core cooling fluid line while the battery is charging, and control the first and second valve to pass cooling fluid through the electric motor cooling fluid line and a heater core cooling fluid line while the battery is not charging.

* * * * *